United States Patent
Sarin

(10) Patent No.: US 6,221,276 B1
(45) Date of Patent: Apr. 24, 2001

(54) HEAT TRANSFER LIQUID WITH POTASSIUM FORMATE FOR VENTILATION AND AIR CONDITIONING INSTALLATIONS

(75) Inventor: Dan Sarin, Helsinki (FI)

(73) Assignee: ABB Installaatiot Oy (FI)

( * ) Notice: Subject to any disclaimer, the term of this patent is extended or adjusted under 35 U.S.C. 154(b) by 0 days.

(21) Appl. No.: 09/330,171

(22) Filed: Jun. 11, 1999

Related U.S. Application Data

(62) Division of application No. 09/051,723, filed as application No. PCT/FI96/00548 on Oct. 16, 1996, now abandoned.

(30) Foreign Application Priority Data

Oct. 17, 1995 (FI) ......................................................... 954953

(51) Int. Cl.$^7$ ....................................................... C09K 5/00
(52) U.S. Cl. .............................. 252/76; 252/79; 252/67; 252/69; 252/75; 62/112; 62/114
(58) Field of Search .................................. 252/76, 79, 75, 252/67, 69; 62/114, 112

(56) References Cited

U.S. PATENT DOCUMENTS

| | | | |
|---|---|---|---|
| 2,233,185 | * | 2/1941 | Smith ...................................... 252/76 |
| 3,740,966 | * | 6/1973 | Pravda ..................................... 62/476 |
| 4,980,075 | * | 12/1990 | Dobrez et al. .......................... 252/71 |
| 5,064,551 | * | 11/1991 | Smith ...................................... 252/70 |
| 5,065,598 | * | 11/1991 | Kurisu et al. ........................... 62/330 |
| 5,104,562 | * | 4/1992 | Kardos et al. .......................... 252/79 |
| 5,846,450 | * | 12/1998 | Atkinson ............................... 252/69 |

FOREIGN PATENT DOCUMENTS

| | | | |
|---|---|---|---|
| 0677563 | * | 10/1995 | (EP) . |
| 93/09198 | * | 5/1993 | (WO) . |
| 96/26990 | * | 9/1996 | (WO) . |
| 96/39472 | * | 12/1996 | (WO) . |

* cited by examiner

*Primary Examiner*—Necholus Ogden
(74) *Attorney, Agent, or Firm*—Nixon & Vanderhye P.C.

(57) ABSTRACT

The invention relates to a heat transfer liquid for ventilation and air-conditioning installations to be used at low temperatures, in which installations heat is recovered from the exhaust air and conveyed to the supply air by means of a heat transfer liquid. For lowering the costs and eliminating environmental risks, the heat transfer liquid contains potassium formiate and water.

4 Claims, No Drawings

HEAT TRANSFER LIQUID WITH POTASSIUM FORMATE FOR VENTILATION AND AIR CONDITIONING INSTALLATIONS

This application is a division of Ser. No. 09/051,723 Sep. 9, 1998 now abandoned, which is a 371 of PCT/FI96/00548 filed Oct. 16, 1996.

The invention relates to a heat transfer liquid for ventilation and air conditioning installations used at low temperatures, in which installations heat is recovered from exhaust air and conveyed to supply air by means of the heat transfer liquid.

In the ventilation installations in temperate and frigid climate zones, heat is nowadays generally recovered from exhaust air and transferred to supply air. This allows cutting down the annual heat consumption of air-conditioning to less than a half, and the total consumption of energy in buildings by more than 25%.

Perhaps the commonest way of heat recovery is a so-called liquid circulation system, in which the heat of the exhaust air is bound to the heat transfer liquid in a heat exchanger and the liquid is pumped via a pipeline to a supply air heat exchanger in which the heat is transferred to the supply air. The cooled liquid returns to an exhaust air exchanger to be re-heated etc.

Water would be an ideal heat transfer liquid as regards all its characteristics, but it cannot be used in systems of this kind because the supply air heat exchanger has a direct contact with cold outdoor air. When a high degree of heat recovery is required, the temperature of the heat transfer liquid drops below the freezing point of water, that is, down to $-10 \ldots -15°$ C. in Finnish climate.

For the above reasons, a mixture of ethylene glycol and water is nowadays used as a heat transfer liquid, the glycol content generally being about 30%. Although ethylene glycol is well suited for cooling of engines, where the temperature of the liquid is high, it exhibits a number of disadvantageous characteristics in heat recovery installations.

The most serious drawback is a poor heat transfer co-efficient at low temperatures. The heat transfer co-efficient of glycol as such is poorer than that of water. The situation is made worse by a high viscosity at the room temperature. The worst thing, however, is the phenomenon that the viscosity increases rapidly as the temperature becomes lower. It is thus more than fourfold in $-15°$ C. as compared with water at a temperature of $0°$ C. Consequently, in order to achieve a certain degree of heat recovery, remarkably larger heat exchangers must be employed as compared with the case where water would be used as the heat transfer liquid. A minimum of 30% more heat surface is required. This results in the fact that the energy consumption in the air system increases, the noise level increases etc. The costs also increase nearly in a direct proportion to the heat surface.

Correspondingly, the situation falls easily into the laminar flow range, which results in erratic deterioration of heat transfer. Consequently, high flow velocities must be maintained in the pipelines and heat exchangers, which results in high power consumption, costly pumps etc.

The situation is especially difficult in a system according to a Finnish published patent application No. 92867 in which heat recovery, heating and cooling are integrated in one flow circuit. Integration remarkably enlarges the area in which the heat transfer must function well. It also leads to the situation that the liquid flow must be adjusted. The risk of falling into the laminar flow range thus increases, for which reason special demands must be set on adjustment, the installations must be designed for a poorer efficiency as would be necessary otherwise, etc.

Another drawback of ethylene solution is a low surface tension, for which reason it is difficult to make the pipelines tight. Pipes, sealings, valves etc. with special design must be employed in the pipelines. This raises the investment costs and maintenance costs and increases malfunctions due to leakages etc.

More and more attention has been paid recently to environmental questions. Ethylene glycol is problematic in this respect, too. It has been classified as a product hazardous to environment and must thus be disposed of at a hazardous waste disposal plant. Ethylene glycol is also poisonous. For the above reason, it cannot be used e.g. in food industry or elsewhere where a risk of poisoning exists. Propylene glycol is used instead, having all the drawbacks mentioned above and, in addition, a transfer co-efficient which is substantially poorer than that of ethylene glycol.

In fact, the only advantage of glycol solutions for which they are also generally used is that they do not cause any problems as regards corrosion. In this respect they are superior e.g. to NaCl and $CaCl_2$ solutions, which are better in all other respects. NaCl and $CaCl_2$ solutions have been used to some extent in cooling technology, but the costs caused by more expensive materials required due to corrosion have prevented their use from becoming more widespread.

It has been endeavoured to solve the problems caused by corrosion by using inhibitors. U.S. Pat. Nos. 4,338,209 and 4,219,433, for instance, disclose complex compounds whose effect may be excellent, but, whose content and composition are extremely costly and difficult to control in practice. Solutions having a complex composition are also disclosed for various purposes, the control of said solutions also being difficult. Such a solution is e.g. an aqueous solution of ammonia, glycol, potassium formate and potassium acetate mainly for combustion engines as disclosed in European Patent No. 0306972. U.K. Patent 1,387,810, in turn, discloses an aqueous solution of ammonium chloride and ammonia for sprinkler installations etc.

It is common to most of the solutions disclosed above, that, in addition to having a poor controllability, they mostly contain such a component, such as ammonia, that they cannot be used in heat recovery installations inside buildings owing to a leakage risk. In addition, heat transfer is poor in most cases at low temperatures. It is also often difficult to find an inhibitor suitable for all the components. The stability of most complex solutions has also proved poor in long-term use. A complex composition also usually results in high manufacturing costs. Due to the above-mentioned facts the above heat transfer liquids are not used in the heat transfer of air-conditioning installations.

It is an object of the invention to provide a heat transfer liquid that eliminates the drawbacks of the prior art mentioned above. This is achieved with a heat transfer liquid in accordance with the invention. The heat transfer liquid of the invention is characterized by containing potassium formiate and water.

The advantage of the invention is above all the fact that the heat transfer liquid has a simple composition, its heat transfer characteristics and viscosity are similar to those of water. The heat transfer liquid of the invention is not poisonous or environmentally harmful either. The surface tension constant of the liquid is approximately the same as that of water, and the corrosion characteristics can be made similar to those of water by means of a simple inhibitor. An advantage is the price of the liquid, which is lower than the price of prior art heat transfer liquids.

As it has been stated above, the heat transfer liquid is characterized by containing potassium formate and water. It has been found that the concentration of potassium formate in the aqueous solution is advantageously 15–35% in standard installations, whereby the amount of water is correspondingly 65–85%.

As is well known, the thermal conductivity of aqueous solutions of salts in moderate concentrations does not differ much from the thermal conductivity of water, and the viscosity of the solution of the invention does not differ from that of water to a significant extent. The heat capacity is slightly poorer than that of water, but it does not cause problems in conventional heat exchangers because its effect may be eliminated by increasing the width of the flow channels, which neither increases the costs nor has any effect on the heat transfer characteristics. The density of the solution, which is higher than that of water, on the other hand, reduces the flow rates. Generally speaking, the heat transfer characteristics of the heat transfer liquid according to the invention are even better than those of water.

The surface tension constant of the heat transfer liquid of the invention is very near the surface tension constant of water so that the building costs and the operation costs of the installations are low. On account of the simple composition, the price of the heat transfer liquid of the invention is remarkably lower than the price of the ethylene glycol solution, and the control of the concentration is easy. It is possible to add a suitable tracing agent or tracing agents in the liquid of the invention in an advantageous manner for maintenance control, carrying out measurements and/or adjustments. Furthermore, the stability of the liquid of the invention is good. All the facts mentioned above result in low maintenance costs.

The health risks, as well as the environmental effects caused by the potassium formiate solution are approximately the same as those of calcium chloride. In these respects it is remarkably better than e.g. propylene glycol.

The corrosion characteristics of the heat transfer liquid of the invention are only slightly poorer than those of water, and this minor drawback is easily eliminated without any remarkable costs by adding some conventional inhibitor or inhibitors to the solution.

The above explanation of the invention is by no means limited to the invention, but the invention may be varied completely freely within the scope of the attached claims.

What is claimed is:

1. In a ventilation or air conditioning installation used at low temperatures, wherein heat is recovered from exhaust air from the installation and conveyed to supply air to the installation by means of a heat transfer liquid, an improvement wherein the heat transfer liquid contains 15–35% potassium formate, and 65–85% water.

2. The installation of claim 1 wherein said heat transfer liquid includes one or more corrosion inhibitors.

3. The installation of claim 1 wherein said heat transfer liquid contains a tracing agent for maintenance control.

4. The installation of claim 1 wherein said heat transfer liquid contains a tracing agent for measurements and/or adjustment.

* * * * *